United States Patent
Kambe

(10) Patent No.: US 9,372,260 B2
(45) Date of Patent: Jun. 21, 2016

(54) OBJECT DETECTING DEVICE, OBJECT DETECTING METHOD, OBJECT DETECTING PROGRAM, AND MOTION CONTROL SYSTEM

(71) Applicant: Honda elesys Co., Ltd., Yokohama-shi, Kanagawa-ken (JP)

(72) Inventor: Takeshi Kambe, Yokohama (JP)

(73) Assignee: HONDA ELESYS CO., LTD., Kanagawa (JP)

(*) Notice: Subject to any disclaimer, the term of this patent is extended or adjusted under 35 U.S.C. 154(b) by 311 days.

(21) Appl. No.: 14/077,984

(22) Filed: Nov. 12, 2013

(65) Prior Publication Data

US 2014/0285372 A1 Sep. 25, 2014

(30) Foreign Application Priority Data

Nov. 13, 2012 (JP) ................. 2012-249112

(51) Int. Cl.

| | | |
|---|---|---|
| *G01S 7/292* | (2006.01) | |
| *G01S 7/41* | (2006.01) | |
| *G01S 13/34* | (2006.01) | |
| *G01S 13/42* | (2006.01) | |
| *G01S 13/52* | (2006.01) | |
| *G01S 13/93* | (2006.01) | |
| *G01S 13/524* | (2006.01) | |
| *G01S 7/35* | (2006.01) | |

(52) U.S. Cl.
CPC .............. *G01S 13/345* (2013.01); *G01S 7/292* (2013.01); *G01S 7/414* (2013.01); *G01S 13/5244* (2013.01); *G01S 13/931* (2013.01); *G01S 13/34* (2013.01); *G01S 13/42* (2013.01); *G01S 13/52* (2013.01); *G01S 2007/356* (2013.01)

(58) Field of Classification Search
CPC ....... G01S 7/292; G01S 7/2921; G01S 7/414; G01S 13/34; G01S 13/345; G01S 13/42; G01S 13/50; G01S 13/52; G01S 13/5244; G01S 13/931
USPC ............. 342/70–72, 104, 107, 109, 118, 146, 342/147, 159, 175, 192
See application file for complete search history.

(56) References Cited

U.S. PATENT DOCUMENTS

| | | | | |
|---|---|---|---|---|
| 5,963,162 A * | 10/1999 | Mochizuki | ............ | G01S 13/345 342/109 |
| 6,356,229 B1 * | 3/2002 | Schneider | ............. | G01S 7/4026 342/195 |
| 6,452,665 B1 * | 9/2002 | Kikuchi | .................. | G01S 7/487 180/169 |
| 6,518,916 B1 * | 2/2003 | Ashihara | ................. | G01S 7/412 342/133 |
| 6,683,559 B2 * | 1/2004 | Matsui | .................. | G01S 13/584 342/159 |

(Continued)

FOREIGN PATENT DOCUMENTS

JP 2000-338232 A 12/2000

*Primary Examiner* — Peter Bythrow
(74) *Attorney, Agent, or Firm* — Keating & Bennett, LLP

(57) ABSTRACT

An object detecting device includes a signal transmitting and receiving unit configured to generate an intermediate frequency signal based on a transmission signal and a reception signal which is a reflected wave thereof, a processing unit configured to determine that an image of a target peak frequency is a virtual image based on noise when it is determined that a peak frequency of predetermined n times the target peak frequency is not present in information based on the intermediate frequency signal generated by the signal transmitting and receiving unit and to detect an object based on the determination result, where n is an integer of 2 or greater.

10 Claims, 11 Drawing Sheets

(56) References Cited

U.S. PATENT DOCUMENTS

| | | | | |
|---|---|---|---|---|
| 6,693,583 B2* | 2/2004 | Tamatsu | G01S 7/354 | 180/167 |
| 7,119,734 B2* | 10/2006 | Nakano | G01S 7/412 | 342/109 |
| 7,339,517 B2* | 3/2008 | Nakanishi | G01S 7/354 | 342/192 |
| 8,077,075 B2* | 12/2011 | Randler | G01S 13/345 | 342/104 |
| 8,390,509 B2* | 3/2013 | Asanuma | G01S 13/931 | 342/147 |
| 8,427,361 B2* | 4/2013 | Sato | G01S 7/354 | 342/107 |
| 8,570,213 B2* | 10/2013 | Nishiyama | G01S 7/046 | 342/159 |
| 2003/0103000 A1* | 6/2003 | Matsui | G01S 13/584 | 342/159 |
| 2003/0122703 A1* | 7/2003 | Kishida | G01S 13/345 | 342/70 |
| 2003/0179129 A1* | 9/2003 | Tamatsu | G01S 7/354 | 342/70 |
| 2004/0174292 A1* | 9/2004 | Isaji | G01S 7/4004 | 342/70 |
| 2005/0225481 A1* | 10/2005 | Bonthron | G01S 7/032 | 342/175 |
| 2006/0022866 A1* | 2/2006 | Walton | G01S 7/352 | 342/194 |
| 2007/0103360 A1* | 5/2007 | Nakanishi | G01S 7/354 | 342/70 |
| 2008/0186223 A1* | 8/2008 | Mayer | G01S 7/032 | 342/109 |
| 2009/0121915 A1* | 5/2009 | Randler | G01S 13/345 | 342/70 |
| 2010/0214153 A1* | 8/2010 | Kikuchi | G01S 7/2921 | 342/70 |
| 2010/0271257 A1* | 10/2010 | Hirogari | G01S 13/726 | 342/107 |
| 2011/0234448 A1* | 9/2011 | Hayase | G01S 13/18 | 342/70 |
| 2013/0268173 A1* | 10/2013 | Kambe | G01S 13/346 | 701/96 |
| 2014/0247180 A1* | 9/2014 | Moriuchi | G01S 7/41 | 342/70 |

* cited by examiner

OBJECT DETECTING DEVICE, OBJECT DETECTING METHOD, OBJECT DETECTING PROGRAM, AND MOTION CONTROL SYSTEM

CROSS-REFERENCE TO RELATED APPLICATIONS

Priority is claimed on Japanese Patent Application No. 2012-249112, filed Nov. 13, 2012, the contents of which are entirely incorporated herein by reference.

BACKGROUND OF THE INVENTION

1. Field of the Invention

The present invention relates to an object detecting device, an object detecting method, an object detecting program, and a motion control system.

2. Description of Related Art

Radar equipment radiates radio waves (for example, millimeter waves) as a transmission signal and detects an object based on a reception signal reflected from the object. An example of such radar equipment is a frequency-modulated continuous wave (FM-CW) radar that uses a frequency-modulated transmission signal to calculate the distance or the relative velocity to an object using a frequency difference (beat frequency) from a reception signal.

Some FM-CW radars include a device such as a direct current-direct current (DC-DC) converter or a clock generator generating a signal of a constant frequency as noise. Noise generated from a noise source like this device causes a problem in that the distance or the relative velocity to a nonexistent object detected depending on the relationship between the noise frequency and the modulation frequency of the transmission signal.

For example, in a method of setting a noise frequency distribution, which is described in Japanese Unexamined Patent Application, First Publication No. 2000-338232, a ghost area signal frequency at which the measured distance from a noise source to a ghost target formed by noise is smaller than the measured distance to a real target is set to be higher than the measurable frequency of a signal-passing band.

SUMMARY OF THE INVENTION

However, in the method of setting a noise frequency distribution described in Japanese Unexamined Patent Application, First Publication No. 2000-338232, there is a problem in that noise having frequencies other than known frequency cannot be reduced.

The present invention is made in consideration of the above-mentioned circumstances and an object thereof is to provide an object detecting device, an object detecting method, an object detecting program, and a motion control system, which can suppress an influence of noise based on a noise source.

According to an aspect of the present invention, an object detecting device is provided including: a signal transmitting and receiving unit configured to generate an intermediate frequency signal based on a transmission signal and a reception signal which is a reflected wave thereof; and a processing unit configured to determine that an image of a target peak frequency is a virtual image based on noise when it is determined that a peak frequency of predetermined n (where n is an integer of 2 or greater) times the target peak frequency is not present in information based on the intermediate frequency signal generated by the signal transmitting and receiving unit and to detect an object based on the determination result.

The object detecting device may further include a distance detecting unit configured to calculate a distance as the information based on the peak frequency of the intermediate frequency signal generated by the signal transmitting and receiving unit, and the processing unit may determine that an image of a peak frequency corresponding to a target distance is a virtual image based on noise when it is determined that target information of a target candidate corresponding to a distance of predetermined n (where n is an integer of 2 or greater) times the distance calculated by the distance detecting unit is not present.

The object detecting device may further include a velocity detecting unit configured to calculate a relative velocity as the information based on the peak frequency of the intermediate frequency signal generated by the signal transmitting and receiving unit, and the processing unit may determine that an image of a peak frequency corresponding to a target relative velocity is a virtual image based on noise when it is determined that target information of a target candidate corresponding to a relative velocity of predetermined n (where n is an integer of 2 or greater) times the relative velocity calculated by the velocity detecting unit is not present based on the target peak frequency.

In the object detecting device, the processing unit may determine that an image of a peak frequency corresponding to a target relative velocity is a virtual image based on noise when it is determined that an IF signal corresponding to predetermined n (where n is an integer of 2 or greater) times the IF signal which is information based on the peak frequency of the intermediate frequency signal generated by the signal transmitting and receiving unit is not present.

In the object detecting device, the processing unit may determine that the image of the target peak frequency is a virtual image based on noise when the absolute value of a difference between a value corresponding to predetermined n (where n is an integer of 2 or greater) times a first distance calculated by a distance detecting unit configured to calculate a distance as the information based on the peak frequency of the intermediate frequency signal generated by the signal transmitting and receiving unit and a value of a second distance calculated by the distance detecting unit is smaller than a predetermined first threshold value and the absolute value between a value corresponding to n times a first relative velocity calculated by the velocity detecting unit and a value of a second relative velocity calculated by the velocity detecting is smaller than a predetermined second threshold value.

The object detecting device may further include an azimuth detecting unit configured to detect an azimuth based on the peak frequency of the intermediate frequency signal generated by the signal transmitting and receiving unit, and the processing unit may determine that the image of the target peak frequency is an image based on a real object when the absolute value of a difference between a first azimuth detected by the azimuth detecting unit and a second azimuth calculated by the azimuth detecting unit is smaller than a predetermined third threshold value and may determine that the image of the target peak frequency is a virtual image based on noise when the absolute value of the difference is equal to or more than the predetermined third threshold value.

In the object detecting device, the processing unit may determine that the image of the target peak frequency is a virtual image based on noise when the peak frequency is not present in a predetermined frequency range including the frequency of the predetermined n times the target peak frequency.

According to another aspect of the present invention, an object detecting method is provided including: a signal transmitting and receiving step of generating an intermediate frequency signal based on a transmission signal and a reception signal which is a reflected wave thereof; and a processing step of determining that an image of a target peak frequency is a virtual image based on noise when it is determined that a peak frequency of predetermined n (where n is an integer of 2 or greater) times the target peak frequency is not present in information based on the intermediate frequency signal generated in the signal transmitting and receiving step and detecting an object based on the determination result.

According to still another aspect of the present invention, an object detecting program is provided causing a computer of an object detecting device to perform: a signal transmitting and receiving procedure of generating an intermediate frequency signal based on a transmission signal and a reception signal which is a reflected wave thereof; and a processing procedure of determining that an image of a target peak frequency is a virtual image based on noise when it is determined that a peak frequency of predetermined n (where n is an integer of 2 or greater) times the target peak frequency is not present in information based on the intermediate frequency signal generated in the signal transmitting and receiving procedure and detecting an object based on the determination result.

According to still another aspect of the present invention, a motion control system is provided including: an object detecting device; a motion control unit configured to control a motion based on a distance or a velocity of an object input from the object detecting device; a signal transmitting and receiving unit configured to generate an intermediate frequency signal based on a transmission signal and a reception signal which is a reflected wave thereof; and a processing unit configured to determine that an image of a target peak frequency is a virtual image based on noise when it is determined that a peak frequency of predetermined n (where n is an integer of 2 or greater) times the target peak frequency is not present in information based on the intermediate frequency signal generated by the signal transmitting and receiving unit and to detect an object based on the determination result.

According to the aspects of the present invention, it is possible to suppress an influence of noise based on a noise source.

DETAILED DESCRIPTION OF THE INVENTION

First Embodiment

Hereinafter, an embodiment of the present invention will be described with reference to the accompanying drawings.

Figure 1:
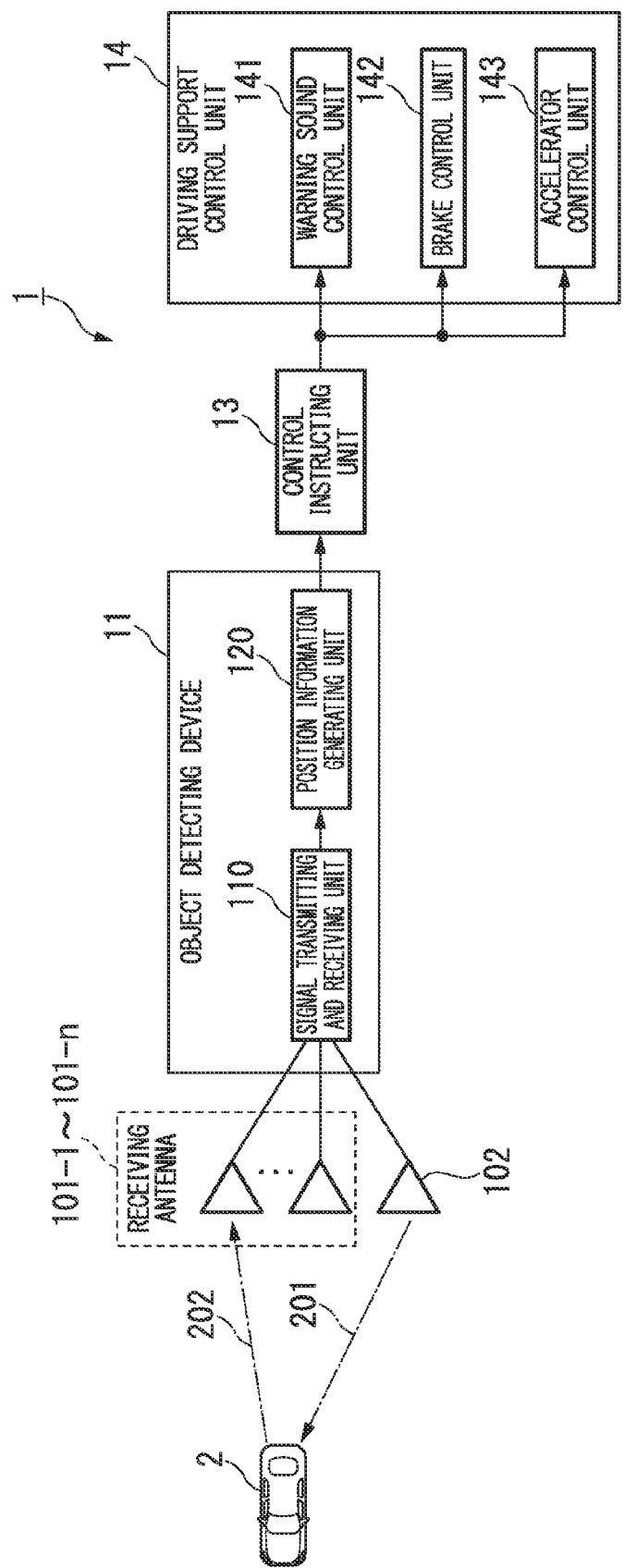
FIG. 1 is a diagram schematically illustrating a configuration of a motion control system according to a first embodiment of the present invention.

FIG. 1 is a diagram schematically illustrating a configuration of a motion control system 1 according to this embodiment.

The motion control system 1 includes n (where n is an integer greater than 1) receiving antennas 101-1 to 101-n, a transmitting antenna 102, an object detecting device 11, a control instructing unit 13, and a driving support control unit 14. For example, the motion control system 1 controls a motion mechanism of a vehicle or presentation of information to a driver of the vehicle.

The object detecting device 11 includes a signal transmitting and receiving unit 110 and a position information generating unit 120.

The signal transmitting and receiving unit 110 generates a transmission signal and outputs the generated transmission signal to the transmitting antenna 102 that radiates a radio wave 201. The signal transmitting and receiving unit 110 generates an intermediate frequency (IF) signal based on a reception signal input from the receiving antennas 101-1 to 101-n that receive a radio wave 202 reflected by an object 2 as a reception signal and the transmission signal. Here, the signal transmitting and receiving unit 110 generates a transmission signal of which a frequency is modulated in multiple modulation periods. The signal transmitting and receiving unit 110 outputs the input reception signal and the generated IF signal to the position information generating unit 120. The configuration of the signal transmitting and receiving unit 110 will be described later.

The position information generating unit 120 calculates a distance, an azimuth, and a relative velocity for each target based on the IF signal input from the signal transmitting and receiving unit 110. A target is information representing a detected object. The position information generating unit 120 generates position information representing the calculated distance, the calculated azimuth, and the calculated relative velocity for each target. The configuration of the position information generating unit 120 will be described later.

The control instructing unit 13 generates a control signal for controlling the operation of the driving support control unit 14 based on the position information of each target input from the position information generating unit 120. The control instructing unit 13 generates the control signal, for example, when a target of which the distance indicated by the input position information is smaller than a predetermined threshold value is included. The control instructing unit 13 outputs the generated control signal to the driving support control unit 14.

The driving support control unit 14 controls the function of supporting the driving of a vehicle based on the control signal input from the control instructing unit 13. The driving support control unit 14 includes, for example, a warning sound control unit 141, a brake control unit 142, and an accelerator control unit 143. The warning sound control unit 141 outputs a warning sound for warning a driver of an approach of an object when the control signal is input. The brake control unit 142 starts a braking operation to decelerate the vehicle, when the control signal is input and the braking operation is not performed. The accelerator control unit 143 stops an accelerating operation to stop the acceleration of the vehicle, when the control signal is input and the accelerating operation is performed.

The configuration of the signal transmitting and receiving unit 110 will be described below.

Figure 2:
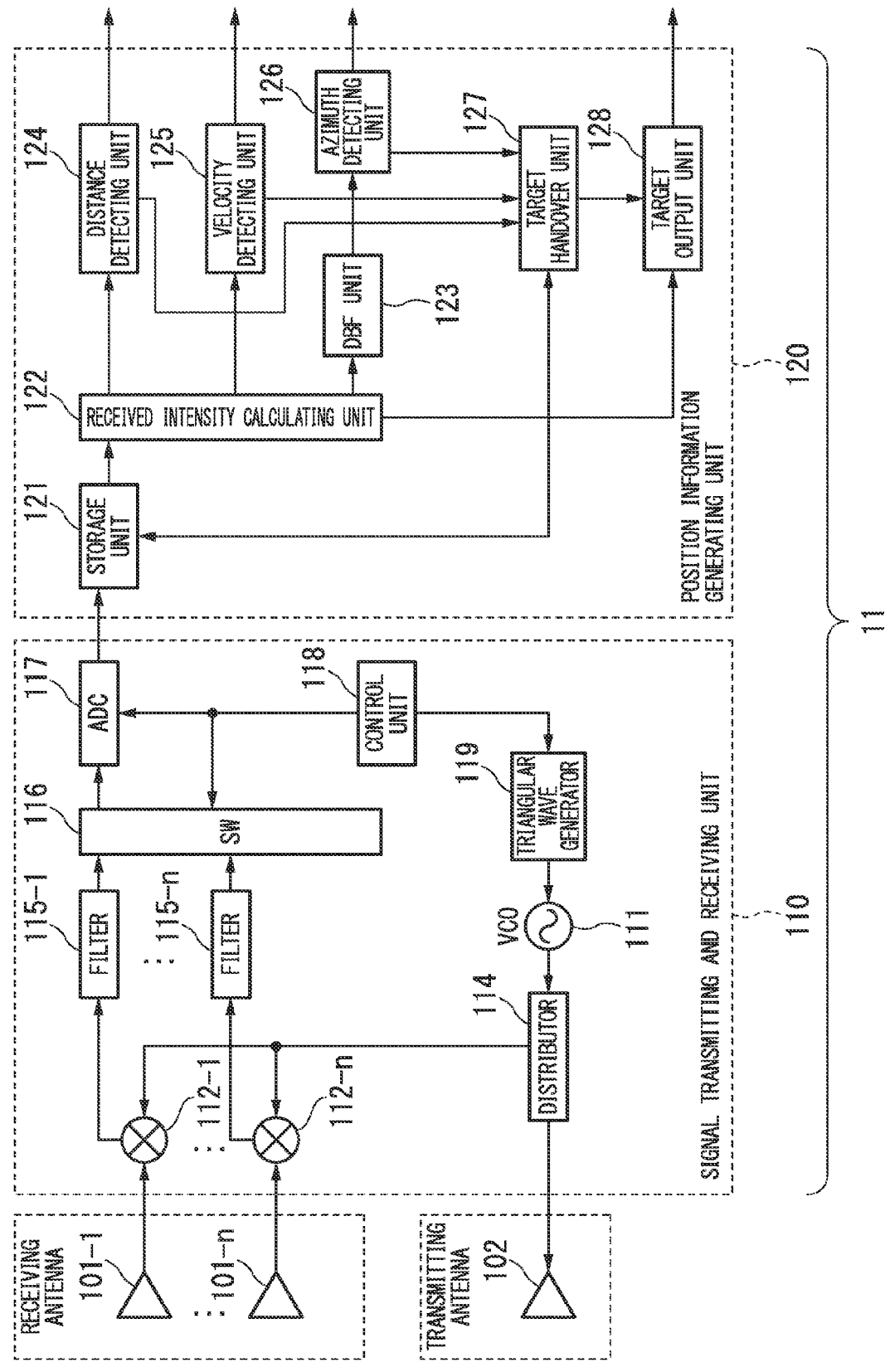
FIG. 2 is a diagram schematically illustrating a configuration of an object detecting device according to the first embodiment.

FIG. 2 is a diagram schematically illustrating the configuration of the object detecting device 11 according to this embodiment.

The signal transmitting and receiving unit 110 includes a voltage-controller oscillator (VCO) 111, a mixer 112, a distributor 114, a filter 115, a switch (SW) 116, an analog-to-digital (AD) converter (ADC) (received wave acquiring unit) 117, a control unit 118, and a triangular wave generator 119.

The VCO 111 generates a signal of a predetermined frequency and frequency-modulates the generated signal based on a triangular wave signal input from the triangular wave generator 119 to generate a transmission signal. The VCO 111 outputs the generated transmission signal to the distributor 114. The transmission signal generated by the VCO 111 is frequency-modulated with a frequency modulation width Δf centered on a predetermined central frequency $f_0$ in the modulation period of the triangular wave. Therefore, the transmission signal has an ascending section in which the frequency increases with the lapse of time and a descending section in which the frequency decreases.

The mixers 112-1 to 112-*n* (where n is an integer of 1 or greater) mix reception signals input from the receiving antennas 101-1 to 101-*n* with the transmission signal input from the distributor 114 to generate IF signals. The IF signals are also referred to as beat signals. Channels corresponding to the receiving antennas 101-1 to 101-*n* are also referred to as CH-1 to CH-n. The frequency of the IF signal is a difference (beat frequency) between the frequency of the corresponding reception signal and the frequency of the transmission signal. The mixers 112-1 to 112-*n* output the generated IF signals of CH-1 to CH-n to the filters 115-1 to 115-*n*.

The distributor 114 distributes the transmission signal input from the VCO 111 and outputs the distributed signal to the transmitting antenna 102 and the mixers 112-1 to 112-*n*.

The filters 115-1 to 115-*n* band-limit the IF signals of CH-1 to CH-n input from the mixers 112-1 to 112-*n* and output the band-limited IF signals to the SW 116.

The SW 116 outputs the IF signals of CH-1 to CH-n input from the filters 115-1 to 115-*n* to the ADC 117 while sequentially switching the channels in synchronization with a sampling signal input from the control unit 118.

The ADC 117 converts the analog IF signals, of which the channels are sequentially switched and which are input from the SW 116, into digital IF signals in an AD conversion manner at a predetermined sampling frequency and sequentially stores the converted IF signals in the storage unit 121 of the position information generating unit 120.

The control unit 118 controls the units of the object detecting device 11. The control unit 118 is, for example, a central processing unit (CPU). The control unit 118 generates a sampling signal of a predetermined sampling period and outputs the generated sampling signal to the SW 116, the ADC 117, and the triangular wave generator 119.

The triangular wave generator 119 generates a triangular wave with a predetermined modulation period using a sampling signal and outputs the generated triangular wave to the VCO 111. The triangular wave is a waveform of which the amplitude linearly increases from a predetermined minimum value to a predetermined maximum value in a predetermined modulation period, reaches the maximum value, and then linearly decreases from the maximum value to the minimum value. The triangular wave generator 119 generates a triangular wave with a modulation period T.

FIG. 2 shows an example where n receiving antennas 101-1 to 101-*n* are provided, but the number of receiving antennas may be one. In this case, the signal transmitting and receiving unit 110 includes the VCO 111, the mixer 112-1, the distributor 114, the filter 115-1, the SW 116, the ADC 117, and the control unit 118.

The configuration of the position information generating unit 120 will be described below.

The position information generating unit 120 includes a storage unit 121, a received intensity calculating unit 122, a digital beam forming (DBF) unit 123, a distance detecting unit 124, a velocity detecting unit 125, an azimuth detecting unit 126, a target handover unit 127, and a target output unit 128.

The received intensity calculating unit 122 reads the IF signal for each channel from the storage unit 121, for example, Fourier-transforms the read IF signals, and calculates complex data of a frequency domain. The received intensity calculating unit 122 outputs the calculated complex data for each channel to the DBF unit 123.

The received intensity calculating unit 122 calculates a spectrum based on a sum value obtained by added the complex data of all the channels. The received intensity calculating unit 122 may calculate a spectrum based on complex data of a certain channel, but can average a noise component to improve an S/N (Signal-to-Noise) ratio by calculating a spectrum based on the sum value.

The received intensity calculating unit 122 detects a portion of which the level is a maximum greater than a threshold value of a predetermined level as a peak of a signal level for each of the ascending section and the descending section from the calculated spectrum (peak detection). The received intensity calculating unit 122 performs the peak detection for each modulation period T. The received intensity calculating unit 122 generates peak frequency information representing the frequency of the peak detected in each of the modulation period T. The received intensity calculating unit 122 outputs the generated peak frequency information to the distance detecting unit 124 and the velocity detecting unit 125.

When no peak is detected, the received intensity calculating unit 122 generates position information representing that a target is not detected, and outputs the generated position information to the target output unit 128.

The DBF unit 123 further Fourier-transforms (spatial-axis Fourier-transforms) the complex data for each channel input from the received intensity calculating unit 122 in the arrangement direction (channel direction) of the antennas and generates complex data of a spatial frequency domain. The DBF unit 123 calculates received intensity which is spectral intensity for each angular channel of a predetermined angle resolution from the generated complex data and generates received intensity information representing the calculated received intensity. The DBF unit 123 outputs the generated received intensity information to the azimuth detecting unit 126.

The distance detecting unit 124 calculates a distance to an object indicated by each target in the modulation period T based on the frequency $f_u$ of the ascending section and the frequency $f_d$ of the descending section indicated by the peak frequency information input from the received intensity calculating unit 122. The distance detecting unit 124 calculates the distance R, for example, using Expression (1).

$$R = \frac{c \cdot T}{2\Delta f} \cdot \frac{f_u + f_d}{2} \quad (1)$$

In Expression (1), c represents the light velocity and T represents the modulation period. That is, Expression (1) represents that the distance $c \cdot T/2$ by which light travels within the elapsed time T/2 of the ascending section or the descending section is multiplied by the ratio of an average value of the frequency $f_u$ of the ascending section and the frequency $f_d$ of the descending section for each target to the modulation frequency $\Delta f$ to obtain the distance R. The distance detecting unit 124 outputs distance information representing the distance to an object indicated by each target in the modulation period T to the target handover unit 127 and the control instructing unit 13 (see FIG. 1).

The velocity detecting unit 125 calculates a relative velocity to an object indicated by each target in the modulation period T based on the frequency $f_u$ of the ascending section and the frequency $f_d$ of the descending section indicated by the peak frequency information input from the received intensity calculating unit 122. The velocity detecting unit 125 calculates the velocity V, for example, using Expression (2).

$$V = \frac{c}{2 \cdot f_0} \cdot \frac{f_u - f_d}{2} \quad (2)$$

That is, Expression (2) represents that the light velocity c is multiplied by a ratio of the difference between the frequency $f_u$ of the ascending section and the frequency $f_d$ of the descending section to the central frequency $f_0$ to obtain the relative velocity V. The velocity detecting unit 125 outputs velocity information representing the relative velocity V of each target in the modulation period T to the target handover unit 127 and the control instructing unit 13 (see FIG. 1).

The azimuth detecting unit 126 detects an angle φ at which the received intensity indicated by the received intensity information input from the DBF unit 123 is a maximum as the azimuth of an object indicated by the corresponding target and generates azimuth information representing the detected azimuth. The azimuth detecting unit 126 outputs the generated azimuth information to the target handover unit 127 and the control instructing unit 13 (see FIG. 1).

The distance information from the distance detecting unit 124, the velocity information from the velocity detecting unit 125, and the azimuth information from the azimuth detecting unit 126 are input to the target handover unit 127. The target handover unit 127 extracts target information which is information of a target candidate based on the input information. The target handover unit 127 reads previous target information from the storage unit 121. The target handover unit 127 correlates the read previous target information with the target information of the currently-extracted target candidate. The target handover unit 127 determines whether an image is a real image based on the distance information input from the distance detecting unit 124, the velocity information input from the velocity detecting unit 125, and the azimuth information input from the azimuth detecting unit 126 as will be described later. When it is determined that an image is a real image, the target handover unit 127 outputs the position information indicating the determination result to the target output unit 128.

The target output unit 128 outputs the position information input from the received intensity calculating unit 122 or the target handover unit 127 to the control instructing unit 13.

The principle in which the position information generating unit 120 detects the distance and the relative velocity will be described below.

Figure 3:
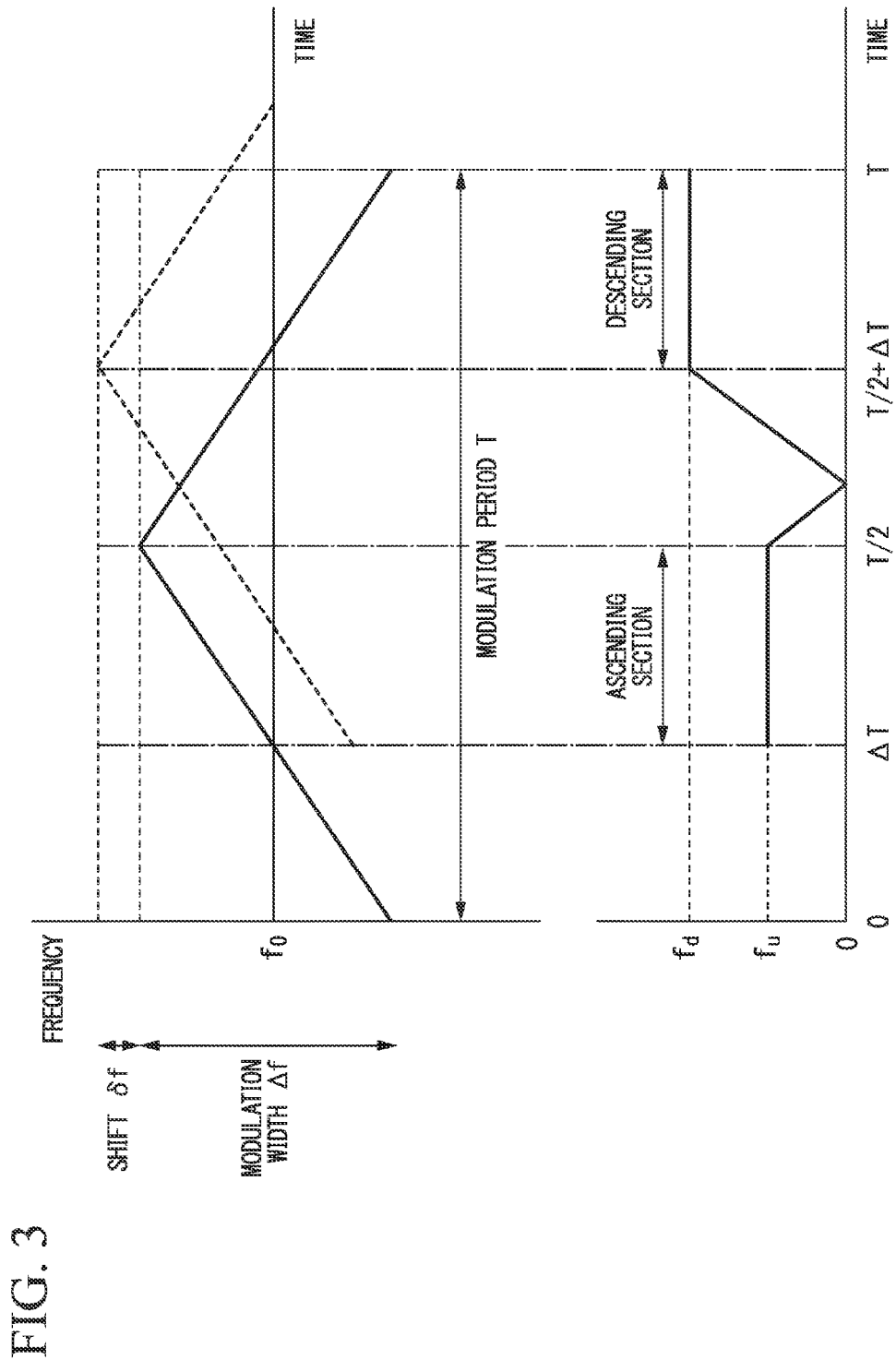
FIG. 3 is a diagram illustrating an example of a transmission signal and a reception signal according to the first embodiment.

FIG. 3 is a diagram illustrating an example of a transmission signal and a reception signal according to this embodiment.

In FIG. 3, the horizontal axis represents the time and the vertical axis represents the frequency. In the example shown in FIG. 3, the modulation period of the transmission signal is defined as T.

In the upper part of FIG. 3, the frequency of the transmission signal is indicated by a solid line and the frequency of the reception signal is indicated by a dotted line. The transmission signal is frequency-modulated with a modulation width $\Delta f$ centered on the central frequency $f_0$. In the example shown in FIG. 3, the reception signal is frequency-shifted by $\delta f$ with a delay of $\Delta T$. The delay $\Delta T$ represents a delay until a reflected wave from an object is received after the transmission signal is transmitted. The shift $\delta f$ is based on the Doppler effect due to occurrence of the relative velocity V to an object. Therefore, as the distance R to the object increases, the delay time $\Delta T$ increases, and as the relative velocity to an object increases, the shift $\delta f$ increases.

In the lower part of FIG. 3, the frequency of an IF signal is indicated by a sold line. The frequency of the IF signal is an absolute value of a difference between the frequency of the reception signal and the difference of the transmission signal. The frequency of the IF signal shown in the lower part of FIG. 3 is the frequency of the peak detected by the received intensity calculating unit 122. In the ascending section, the frequency of the IF signal is $f_u$. The ascending section is a section in which the frequencies of both the transmission signal and the reception signal rise with the lapse of time. In FIG. 3, the ascending section is from time $\Delta T$ to time T/2. In the descending section, the frequency of the IF signal is $f_d$. The descending section is a section in which the frequencies of both the transmission signal and the reception signal fall with the lapse of time. In FIG. 3, the descending section is from time T/2+$\Delta T$ to time T. The modulation width $\Delta f$ and the frequency shift $\delta f$ are determined by the frequency $f_u$ of the ascending section and the frequency $f_d$ of the descending section. Therefore, in this embodiment, it is possible to calculate the distance R and the relative velocity V based on the frequency $f_u$ of the ascending section and the frequency $f_d$ of the descending section detected by the received intensity calculating unit 122.

Figure 4:
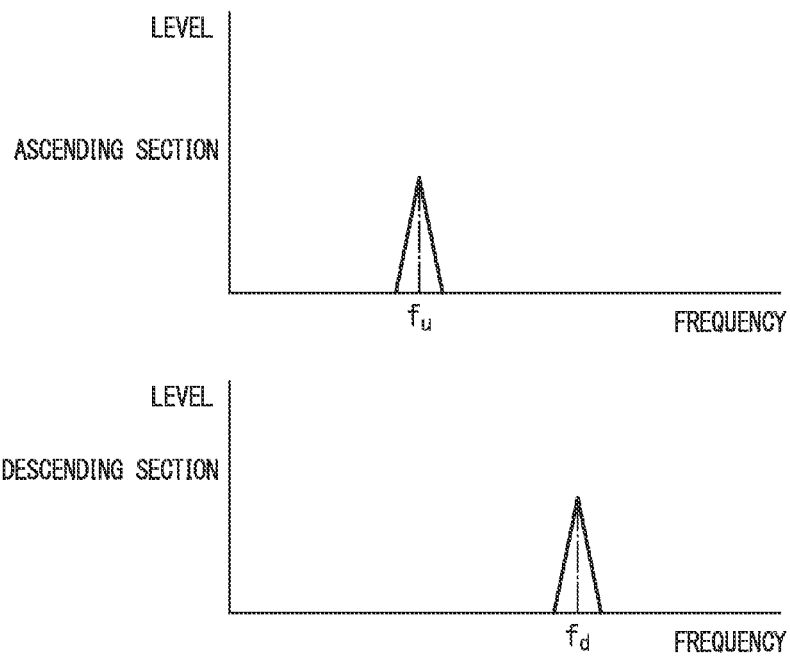
FIG. 4 is a diagram illustrating an example of a level-frequency characteristic of an IF signal.

FIG. 4 is a diagram illustrating an example of a level-frequency characteristic of an IF signal.

In FIG. 4, the horizontal axis represents the frequency and the vertical axis represents the level. The upper part of FIG. 4 shows the level of an IF signal in the ascending section. The level of the IF signal has a peak at the frequency $f_u$ of the ascending section. The lower part of FIG. 4 shows the received intensity (level) of the IF signal in the descending section. The level of the IF signal has a peak at the frequency $f_d$ of the descending section.

The received intensity calculating unit 122 may detect frequencies of peaks corresponding to multiple targets. In this case, the received intensity calculating unit 122 generates peak frequency information in correlation with a common target in the order of increasing the frequency for each of the ascending section and the descending section, and outputs the generated peak frequency information to the distance detecting unit 124 and the velocity detecting unit 125.

A virtual image based on reflection will be described below.

Figure 5:
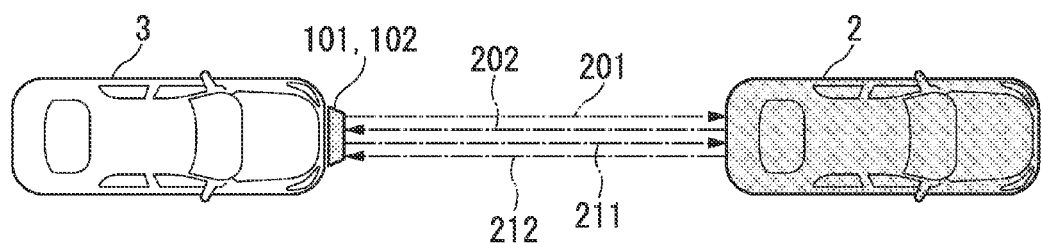
FIG. 5 is a diagram illustrating reflection of a transmission signal and a reception signal.

FIG. 5 is a diagram illustrating reflection of a transmission signal and a reception signal. In the below description, it is assumed that the motion control system 1 includes one receiving antenna 101-1. In FIG. 5, a vehicle 3 has the motion control system 1 according to this embodiment mounted thereon and has a receiving antenna 101-1 and a transmitting antenna 102 mounted on the front side thereof. An object 2 is a vehicle traveling in front of the vehicle 3.

As shown in FIG. 5, a transmission signal 201 is radiated from the transmitting antenna 102. The transmission signal 201 is reflected by the object 2 and the reflected RF wave 202 is returned to the motion control system 1. When the returned RF wave 202 comes in contact with and is reflected by at least one of the vehicle 3, the receiving antenna 101-1, and the transmitting antenna 102, the reflected RF wave 211 is reflected by the object 2 again and the reflected RF wave 212 may be returned to the motion control system 1.

Figure 6:
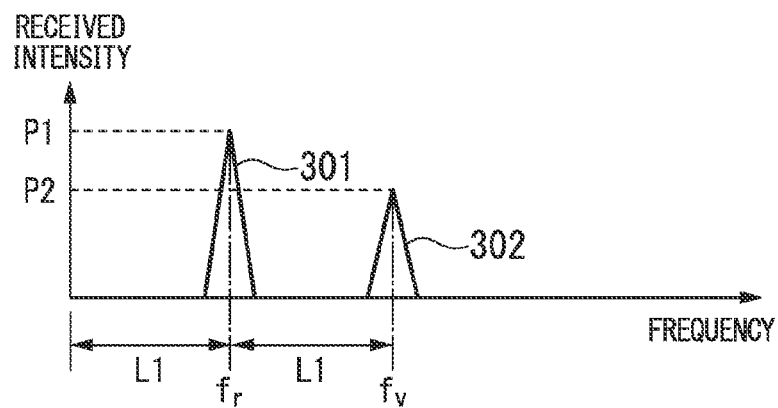
FIG. 6 is a diagram illustrating an example of a level-frequency characteristic of an IF signal when a virtual image based on reflection is formed.

FIG. 6 is a diagram illustrating an example of a level-frequency characteristics of an IF signal when a virtual image based on reflection is formed. In FIG. 6, the horizontal axis represents the frequency and the vertical axis represents the received intensity of an IF signal. Here, a lower frequency means that the object is closer to the receiving antenna 101-1 and the transmitting antenna 102. A higher frequency means that the object is farther away from the receiving antenna 101-1 and the transmitting antenna 102. In this manner, the height of the frequency corresponds to the distance to the object.

In FIG. 6, the IF signal 301 is a real image corresponding to a real object based on the transmitted wave 201 and the RF wave 202. The received intensity of the IF signal 301 is P1 and has a peak at a frequency $f_r$. The frequency $f_r$ corresponds to the distance L1 from the vehicle 3. Here, the real image based on reflection is target information indicating a peak of a frequency characteristic of an IF signal based on the reflected wave from the object 2.

The IF signal 302 is a virtual image based on the RF wave 211 and the RF wave 212. The received intensity of the IF signal 302 is P2 and has a peak at a frequency $f_v$. Here, the received intensity P1 is greater than the received intensity P2. The frequency $f_v$ is two times the frequency $f_r$. Accordingly, the frequency $f_v$ corresponds to the distance 2×L1 from the vehicle 3. Here, the virtual image based on reflection is target information indicating a peak of a frequency component other than the real image, for example, a noise component mixed into the IF signal or a difference frequency between the IF signal and the noise component.

In this manner, the virtual image based on reflection is formed at the frequency $f_v$ corresponding to two times the frequency $f_r$ of the real image. The distance 2×L1 with which the virtual image is detected is two times the distance L1 with which the real image is detected. The motion control system 1 performs control such as brake control on the detection result of a real image closer from the vehicle 3. Accordingly, even when the motion control system 1 cannot be suppressed the influence of the virtual image based on reflection, the position detected by the virtual image is farther than the position detected by the real image, which does not cause any problem for a user.

A virtual image based on noise will be described below.

Figure 7:
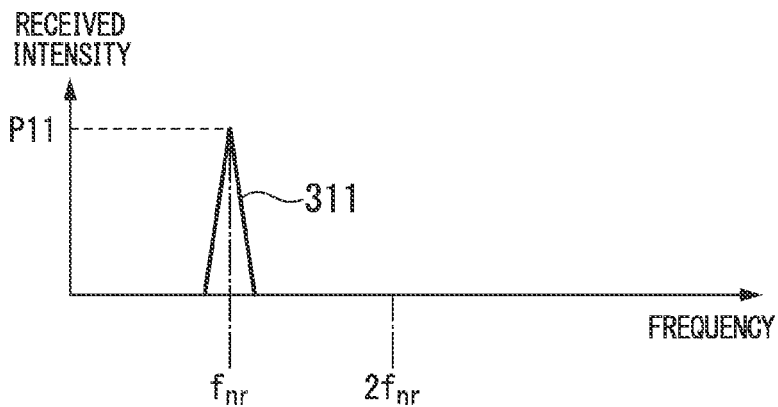
FIG. 7 is a diagram illustrating an example of a level-frequency characteristic of an IF signal when a virtual image based on noise is formed.

FIG. 7 is a diagram illustrating an example of a level-frequency characteristics of an IF signal when a virtual image based on noise is formed. In FIG. 7, the horizontal axis represents the frequency and the vertical axis represents the received intensity of an IF signal.

The example of FIG. 7 shows an IF signal 311 based on noise generated in the signal transmitting and receiving unit 110 or the position information generating unit 120. The received intensity of the IF signal 311 based on noise is P11 and has a peak at a frequency $f_{nr}$. The IF signal 301 based on noise is formed by noise such as strong power from the outside of the motion control system 1. The IF signal formed by noise is referred to as a virtual image based on noise in this embodiment. In the IF signal 311 generated by noise, a virtual image is not formed at a frequency $2f_{nr}$ corresponding to two times the frequency $f_{nr}$.

A motion control system according to a comparative example in which a process of suppressing a virtual image based on noise according to this embodiment is not performed will be described below. The process of suppressing a virtual image based on noise is a process of determining whether the IF signal shown in FIGS. 6 and 7 is a virtual image based on noise as will be described later.

In the motion control system according to the comparative example, when a virtual image based on noise is formed at a frequency corresponding to a short distance, it may be detected that an object is present ahead and deceleration control may be performed by the brake control unit 142 depending on the detection result. However, since the detected image is a virtual image based on noise, no object is actually present ahead of the motion control system according to the comparative example. Therefore, in the motion control system according to the comparative example, deceleration control which is not desired by a user may be performed.

Accordingly, the motion control system 1 according to this embodiment suppresses an influence of a virtual image based on noise in detecting an object by determining whether an image is a virtual image based on noise as will be described later.

An object detecting process according to this embodiment will be described below.

Figure 8:
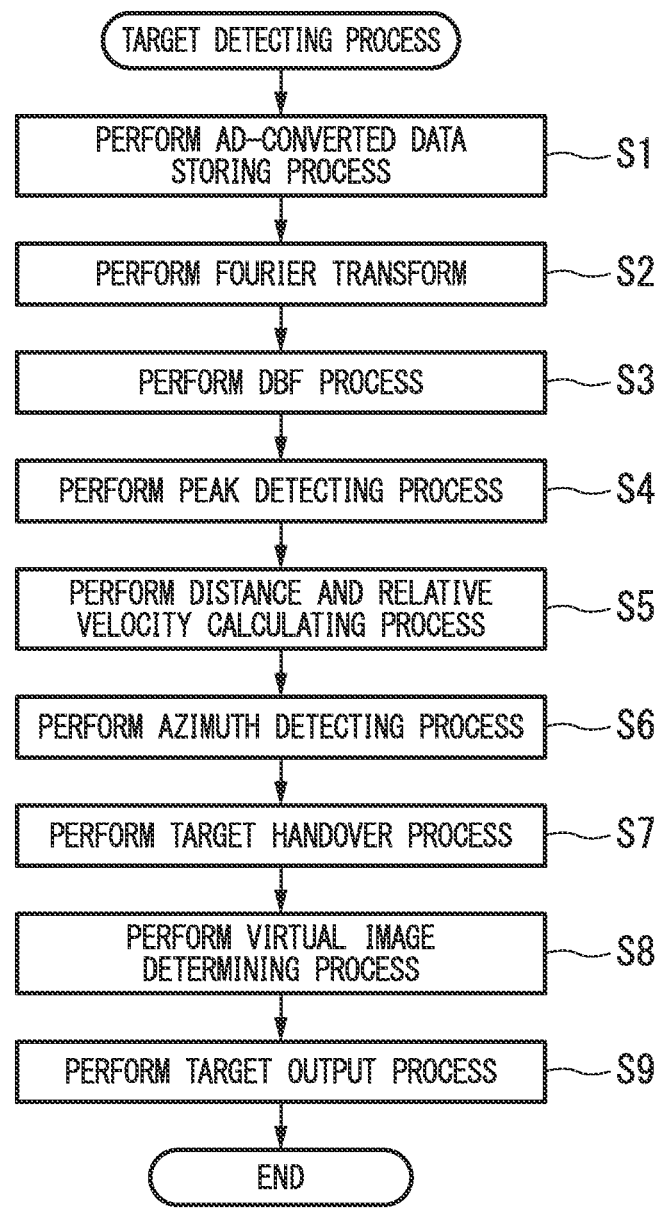
FIG. 8 is a flowchart illustrating an object detecting process according to the first embodiment.

FIG. 8 is a flowchart illustrating the object detecting process according to this embodiment.

(Step S1) The VCO 111 generates a transmission signal which is frequency-modulated with a modulation width $\Delta f$ centered on a central frequency $f_0$ for each modulation period T. The ADC 117 converts the analog IF signals generated by mixing the reception signal and the transmission signal into digital IF signals and sequentially stores the converted IF signals in the storage unit 121 of the position information generating unit 120 (data storage). Thereafter, the process flow proceeds to step S2.

(Step S2) The received intensity calculating unit 122 Fourier-transforms the IF signals read from the storage unit 121 and calculates complex data in the frequency domain. The received intensity calculating unit 122 outputs the calculated complex data to the DBF unit 123. Thereafter, the process flow proceeds to step S3.

(Step S3) The DBF unit 123 calculates the received intensity based on the generated complex data and generates received intensity information indicating the calculated received intensity. The DBF unit 123 outputs the generated received intensity information to the azimuth detecting unit 126. Thereafter, the process flow proceeds to step S4.

(Step S4) The received intensity calculating unit 122 calculates a spectrum based on the complex data. The received intensity calculating unit 122 detects a portion, at which the level is the maximum and is greater than a predetermined threshold value, as a peak of the signal level in each of the ascending section and the descending section for each modulation period T from the calculated spectrum. The received intensity calculating unit 122 generates peak frequency information indicating the detected peak frequency and outputs the generated peak frequency information to the distance detecting unit 124 and the velocity detecting unit 125. Thereafter, the process flow proceeds to step S5.

(Step S5) The distance detecting unit 124 calculates the distance R to an object indicated by each target information piece for each modulation period T, for example, using Expression (1) based on the frequency $f_u$ of the ascending section and the frequency $f_d$ of the descending section indicated by the peak frequencies input from the received intensity calculating unit 122. The distance detecting unit 124 outputs distance information indicating the calculated distance R for each target information piece to the real image determining unit 127.

The velocity detecting unit 125 calculates the relative velocity V to an object indicated by each target information piece for each modulation period T, for example, using Expression (2) based on the frequency $f_u$ of the ascending section and the frequency $f_d$ of the descending section indicated by the peak frequencies input from the received intensity calculating unit 122. The velocity detecting unit 125 outputs velocity information indicating the calculated relative velocity V for each target information piece to the target handover unit 127. Thereafter, the process flow proceeds to step S6.

(Step S6) The azimuth detecting unit 126 detects the angle φ at which the received intensity indicated by the received intensity information input from the DBF unit 123 is the maximum as the azimuth of the object indicated by the target information, and generates azimuth information indicating the detected azimuth. The azimuth detecting unit 126 outputs the generated azimuth information to the target handover unit 127. Thereafter, the process flow proceeds to step S7.

(Step S7) The distance information from the distance detecting unit 124, the velocity information from the velocity detecting unit 125, and the azimuth information from the azimuth detecting unit 126 are input to the target handover unit 127. The target handover unit 127 extracts a target information piece as a target candidate based on the input information. The target handover unit 127 reads the previous target information piece from the storage unit 121.

The target handover unit 127 correlates the read previous target information piece with the currently-extracted target information piece of a target candidate. Thereafter, the process flow proceeds to step S8.

(Step S8) The target handover unit 127 determines whether an image is a virtual image based on the distance information input from the distance detecting unit 124, the velocity information input from the velocity detecting unit 125, and the azimuth information input from the azimuth detecting unit 126. When it is determined the image is not a virtual image, the target handover unit 127 outputs position information indicating the determination result to the target output unit 128. Thereafter, the process flow proceeds to step S9.

(Step S9) The target output unit 128 outputs the position information input from the target handover unit 127 to the control instructing unit 13. Thereafter, the process flow ends.

A virtual image determining process which is performed by the target handover unit 127 will be described below.

Figure 9:
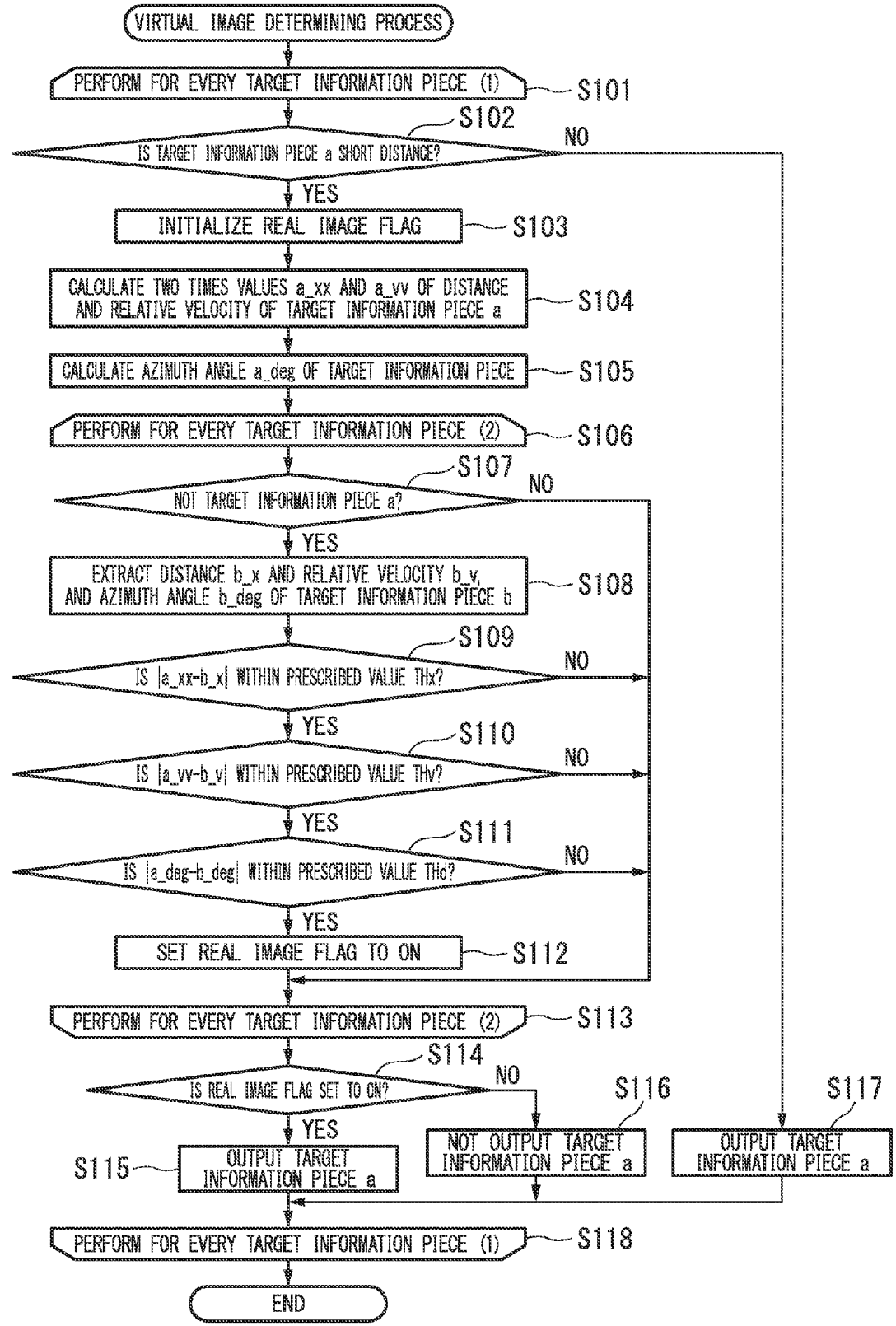
FIG. 9 is a flowchart illustrating a virtual image determining process according to the first embodiment.

FIG. 9 is a flowchart illustrating a virtual image determining process according to this embodiment.

(Step S101) The target handover unit 127 performs the processes of steps S102 to S118 for each target information piece (referred to as target information piece "a") as a target candidate.

(Step S102) The target handover unit 127 extracts the distance a_x of target information piece "a" from the distance information input from the distance detecting unit 124. For example, the target handover unit 127 extracts the IF signal 301 as target information piece "a" in the example illustrated in FIG. 6. Then, the target handover unit 127 determines whether the extracted distance a_x of target information piece "a" is a short distance. Here, the short distance is a distance with which deceleration control based on the target detected by the virtual image based on noise is not desired for a user and is, for example, a range within 20 [m]. The target handover unit 127 performs the process of step S103 when it is determined that the distance a_x of target information piece "a" is a short distance (YES in step S102), and performs the process of step S117 when it is determined that the distance of target information piece "a" is not a short distance (NO in step S102).

(Step S103) The target handover unit 127 initializes a real image flag. Here, the initialized real image flag is in the OFF state. The real image flag indicates a real image when it is in the ON state and indicates an unreal image when it is in the OFF state.

(Step S104) The target handover unit 127 extracts a relative velocity a_v of target information piece "a" from the velocity information input from the velocity detecting unit 125. Then, the target handover unit 127 calculates a value a_xx (=2a_x) corresponding to two times the distance a_x of target information piece "a" extracted in step S102. Then, the target handover unit 127 calculates a value a_vv (=2a_v) corresponding to two times the relative velocity a_v of target information piece "a" extracted in step S104. Thereafter, the process flow proceeds to step S105.

(Step S105) The target handover unit 127 extracts an azimuth angle a_deg of target information piece "a" from the azimuth information input from the azimuth detecting unit 126. Thereafter, the process flow proceeds to step S106.

(Step S106) The target handover unit 127 performs the processes of steps S107 to S113 to perform a pairing process.

(Step S107) The target handover unit 127 determines whether the selected target is not target information piece "a". The target handover unit 127 performs the process of step S108 when it is determined that the selected target is not target information piece "a" (YES in step S107) and performs the process of step S113 when it is determined that the selected target is target information piece "a" (NO in step S107).

A case where two or more target information pieces are present will be described below. First, in step S1, the target handover unit 127 selects a first target information piece "a" as a target candidate. In step S106, the target handover unit 127 selects the first target information piece as target information for performing a pairing process. In step S107, since the target information indicates the same target as the first target information piece selected in step S101, the target handover unit 127 does not perform the pairing process but performs the process of step S113. In step S106, the target handover unit 127 selects a second target information piece (referred to as target information piece "b") as a next target candidate. In this case, since target information piece "b" is different from first target information piece "a" selected in step S101, the target handover unit 127 performs the process of step S108.

(Step S108) The target handover unit 127 extracts the distance b_x of target information piece "b" and the relative velocity b_v of target information piece "b" from the distance information and the velocity information input from the distance detecting unit 124 and the velocity detecting unit 125. For example, the target handover unit 127 extracts the IF signal 302 as target information piece "b" in the example illustrated in FIG. 6. Then, the target handover unit 127 extracts the azimuth angle b_deg of target information piece "b" from the azimuth information input from the azimuth detecting unit 126. Thereafter, the process flow proceeds to step S109.

(Step S109) The target handover unit 127 determines whether the absolute value of a difference between the value a_xx corresponding to two times the distance a_x of target information piece "a" calculated in step S104 and the distance b_x of target information piece "b" extracted in step S108 is less than a prescribed value THx (first threshold value). Here, the prescribed value THx is a predetermined threshold value and may be determined by measurement or simulation. The prescribed value THx is, for example, a value close to 0. The target handover unit 127 performs the process of step S110 when it is determined that the absolute value of the difference between the two times value a_xx and the distance b_x is less than the prescribed value THx (YES in step S109), and performs the process of step S113 when it is determined that the absolute value of the difference between the two times value a_xx and the distance b_x is not less than the prescribed value THx (NO in step S109).

(Step S110) The target handover unit 127 determines whether the absolute value of a difference between the value a_vv corresponding to two times the relative velocity a_v of target information piece "a" calculated in step S104 and the relative velocity b_v of target information piece "b" extracted in step S108 is less than a prescribed value THv (second threshold value). Here, the prescribed value THv is a predetermined threshold value and may be determined by measurement or simulation. The prescribed value THv is, for example, a value close to 0. The target handover unit 127 performs the process of step S111 when it is determined that the absolute value of the difference between the two times value a_vv and the relative velocity b_v is less than the prescribed value THv (YES in step S110), and performs the process of step S113 when it is determined that the absolute value of the difference between the two times value a_vv and the relative velocity b_v is not less than the prescribed value THv (NO in step S110).

(Step S111) The target handover unit 127 determines whether the absolute value of a difference between the azimuth angle a_deg of target information piece "a" calculated in step S105 and the azimuth angle b_deg of target information piece "b" extracted in step S108 is less than a prescribed value THd (third threshold value). The prescribed value THd is, for example, a value close to 0. Here, the prescribed value THd is a predetermined threshold value and may be determined by measurement or simulation. The target handover unit 127 performs the process of step S112 when it is determined that the absolute value of the difference between the azimuth angle a_deg and the azimuth angle b_deg is less than the prescribed value THd (YES in step S111), and performs the process of step S113 when it is determined that the absolute value of the difference between the azimuth angle a_deg and the azimuth angle b_deg is not less than the prescribed value THd (NO in step S111).

(Step S112) The target handover unit 127 sets the real image flag to the ON state and performs the process of step S113.

(Step S113) The target handover unit 127 selects a target information piece as a next target candidate again in step S106. When the processes of steps S108 to S112 are performed on all the target information pieces, the target handover unit 127 performs the process of step S114.

(Step S114) The target handover unit 127 determines whether the real image flag is in the ON state. The target handover unit 127 performs the process of step S115 when it is determined that the real image flag is in the ON state (YES in step S114), and performs the process of step S116 when it is determined that the real image flag is not in the ON state (NO in step S114).

(Step S115) Since target information piece "a" is a real image, the target handover unit 127 outputs target information piece "a" to the target output unit 128. Thereafter, the process flow proceeds to step S118.

(Step S116) Since target information piece "a" is not a real image; the target handover unit 127 does not output target information piece "a" to the target output unit 128. Thereafter, the process flow proceeds to step S118.

(Step S117) Since target information piece "a" is not a short distance, the target handover unit 127 outputs target information piece "a" to the target output unit 128. Thereafter, the process flow proceeds to step S118.

(Step S118) The target handover unit 127 selects a target information piece as a next target candidate again in step S101. The target handover unit 127 repeatedly performs the processes of steps S102 to S117 on all the target information pieces.

In this manner, the virtual image determining process ends.

As described above, the object detecting device 11 or the motion control system 1 according to this embodiment includes the signal transmitting and receiving unit 110 configured to generate an intermediate frequency signal based on a transmission signal and a reception signal which is a reflected wave thereof, and the processing unit (the target handover unit 127) configured to determine that an image of a target peak frequency is a virtual image based on noise when it is determined that a peak frequency of predetermined n (where n is an integer of 2 or greater) times the target peak frequency is not present in information based on the intermediate frequency signal generated by the signal transmitting and receiving unit 110 and to detect an object based on the determination result.

According to this configuration, the object detecting device 11 or the motion control system 1 according to this embodiment can determine whether an image is a real image or a virtual image based on noise. As a result, the object detecting device 11 or the motion control system 1 according to this embodiment can suppress the influence of noise from a noise source.

Reasons for comparison of relative velocities will be described below.

Figure 10:
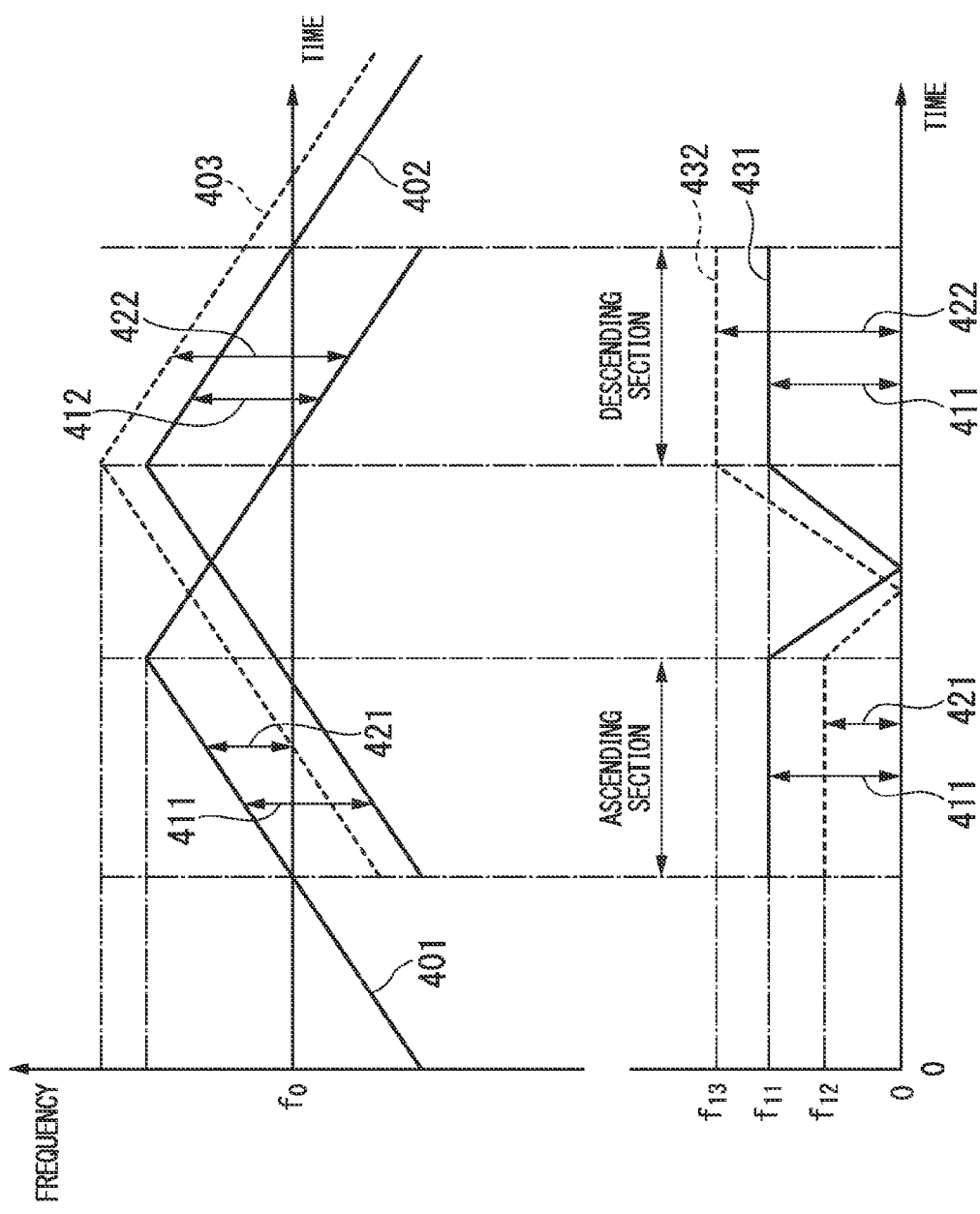
FIG. 10 is a diagram illustrating an example of a transmission signal and a reception signal in a case where moving velocities of a vehicle having the motion control system mounted thereon and an object are equal to each other and in a case where the moving velocities are different from each other.
Figure 11:
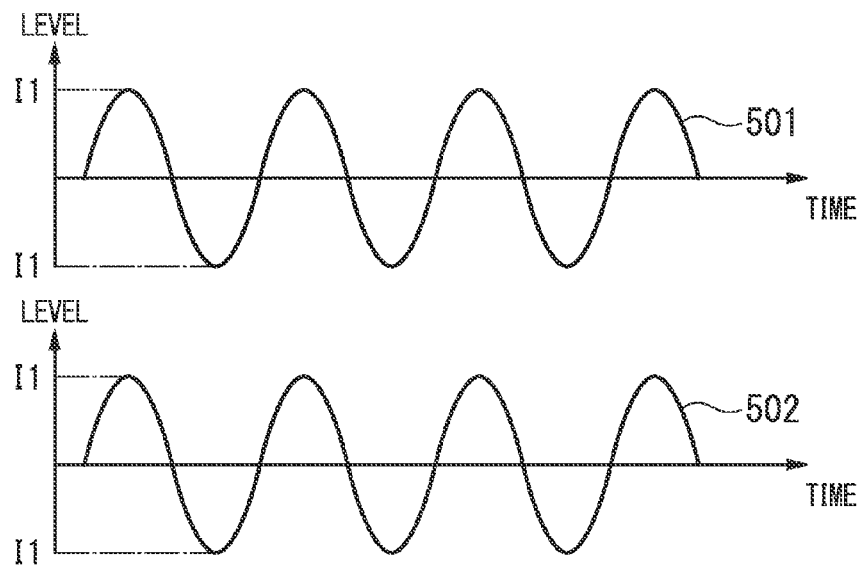
FIG. 11 is a diagram illustrating time vs. signal level in a case where moving velocities of a vehicle having the motion control system mounted thereon and an object are equal to each other.
Figure 12:
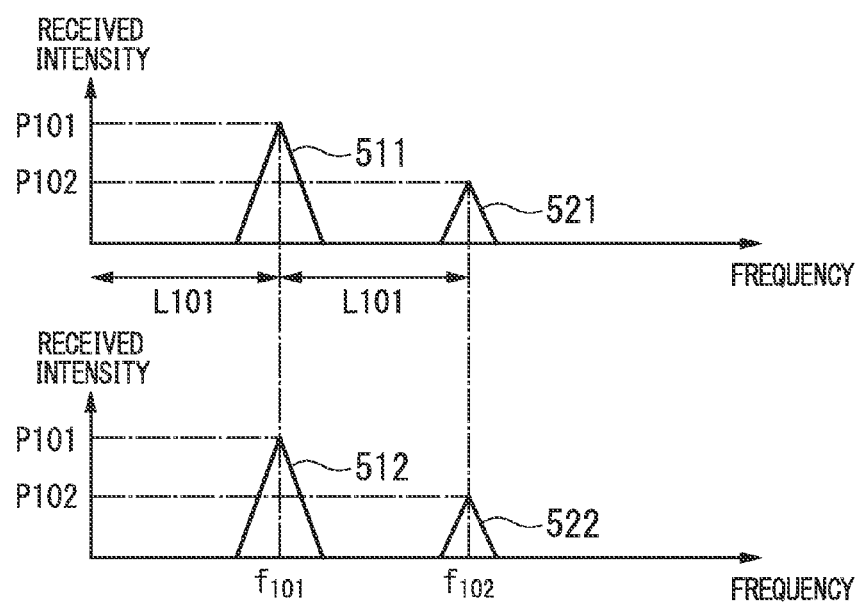
FIG. 12 is a diagram illustrating frequency vs. received intensity in a case where moving velocities of a vehicle having the motion control system mounted thereon and an object are equal to each other.
Figure 13:
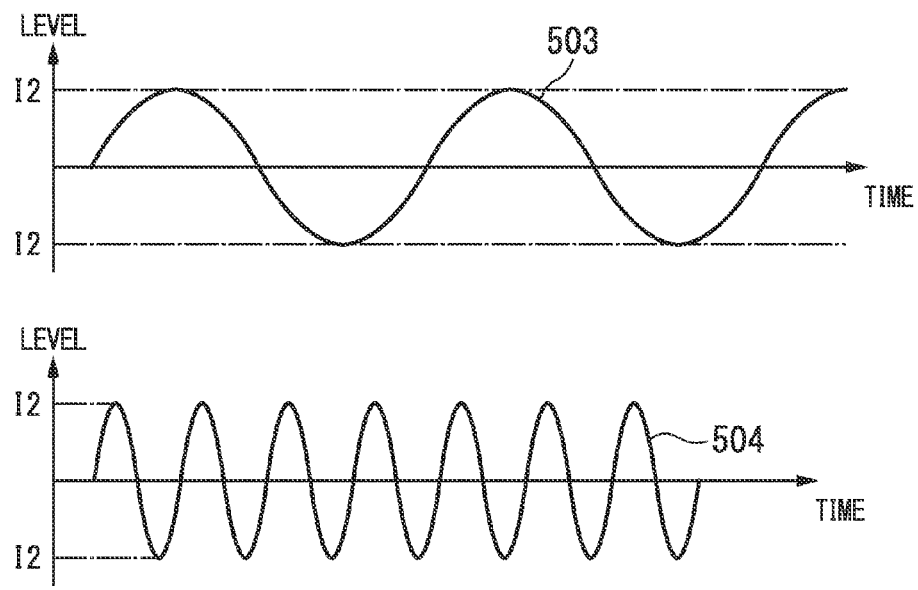
FIG. 13 is a diagram illustrating time vs. signal level in a case where moving velocities of a vehicle having the motion control system mounted thereon and an object are different from each other.

FIG. 10 is a diagram illustrating an example of a transmission signal and a reception signal in a case where moving velocities of a vehicle 3 having the motion control system 1 mounted thereon and an object 2 are equal to each other and in a case where the moving velocities are different from each other. FIG. 11 is a diagram illustrating time vs. signal level in a case where moving velocities of a vehicle 3 having the motion control system 1 mounted thereon and an object 2 are equal to each other. FIG. 12 is a diagram illustrating frequency vs. received intensity in a case where moving velocities of a vehicle 3 having the motion control system 1 mounted thereon and an object 2 are equal to each other. FIG. 13 is a diagram illustrating time vs. signal level in a case where moving velocities of a vehicle 3 having the motion control system 1 mounted thereon and an object 2 are different from each other.

Figure 14:
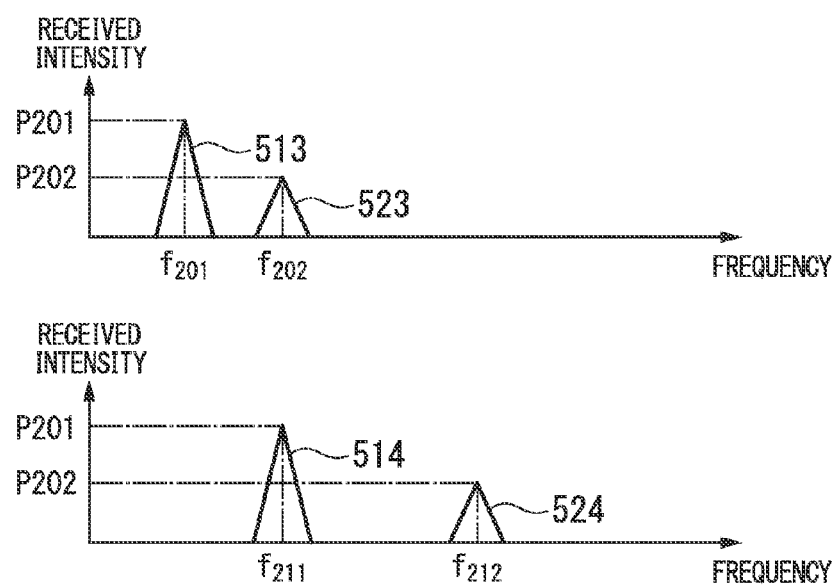
FIG. 14 is a diagram illustrating frequency vs. received intensity in a case where moving velocities of a vehicle having the motion control system mounted thereon and an object are different from each other.

FIG. 14 is a diagram illustrating frequency vs. received intensity in a case where moving velocities of a vehicle 3 having the motion control system 1 mounted thereon and an object 2 are different from each other.

In FIG. 10, the horizontal axis represents a time and the vertical axis represents a frequency. In the upper part of FIG. 10, when the moving velocities of the vehicle 3 having the motion control system 1 mounted thereon and the object 2 are equal to each other, the frequency of the transmission signal is indicated by solid line 401 and the frequency of the reception signal is indicated by solid line 402. When the moving velocities of the vehicle 3 having the motion control system 1 mounted thereon and the object 2 are different from each other, the frequency of the transmission signal is indicated by solid line 401 and the frequency of the reception signal is indicated by dotted line 403. When the moving velocities of the vehicle 3 and the object 2 are equal to each other, the relative velocity of the vehicle 3 and the relative velocity of the object 2 are different from each other and the reception signal moves with respect to the frequency axis due to Doppler shift, as indicated by dotted line 403.

In the upper part and the lower part of FIG. 10, arrow 411 and arrow 412 show a frequency difference between the transmission signal and the reception signal when the moving velocities of the vehicle 3 having the motion control system 1 mounted thereon and the object 2 are equal to each other. Arrow 421 and arrow 422 show a frequency difference between the transmission signal and the reception signal when the moving velocities of the vehicle 3 having the motion control system 1 mounted thereon and the object 2 are different from each other.

In the lower part of FIG. 10, solid line 431 shows the frequency of the IF signal when the moving velocities of the vehicle 3 having the motion control system 1 mounted thereon and the object 2 are equal to each other. Dotted line 432 shows the frequency of the IF signal when the moving velocities of the vehicle 3 having the motion control system 1 mounted thereon and the object 2 are different from each other.

As illustrated in the lower part of FIG. 10, when the moving velocities of the vehicle 3 having the motion control system 1 mounted thereon and the object 2 are equal to each other, the frequencies of the IF signal in the ascending section and the descending section are all $f_{11}$. When the moving velocities of the vehicle 3 having the motion control system 1 mounted thereon and the object 2 are different from each other, the frequency of the IF signal in the ascending section is $f_{12}$ and the frequency of the IF signal in the descending section is $f_{13}$.

The upper part of FIG. 11 is a diagram illustrating time vs. signal level of an ascending section when the moving velocities of the vehicle 3 having the motion control system 1 mounted thereon and the object 2 are equal to each other. The lower part of FIG. 11 is a diagram illustrating time vs. signal level of a descending section when the moving velocities of the vehicle 3 having the motion control system 1 mounted thereon and the object 2 are equal to each other. In FIG. 11, the horizontal axis represents a time and the vertical axis represents a signal level.

As illustrated in FIG. 11, the signal level of waveform 501 in the ascending section ranges from 11 to 11 and the signal level of waveform 502 in the descending section ranges from 11 to 11. That is, when the moving velocities of the vehicle 3 having the motion control system 1 mounted thereon and the object 2 are equal to each other, the signal level of the ascending section and the signal level of the descending section are equal to each other and the signal frequencies thereof are equal to each other.

The upper part of FIG. 12 is a diagram illustrating frequency vs. received intensity of an ascending section when the moving velocities of the vehicle 3 having the motion control system 1 mounted thereon and the object 2 are equal to each other. The lower part of FIG. 11 is a diagram illustrating frequency vs. received intensity of a descending section when the moving velocities of the vehicle 3 having the motion control system 1 mounted thereon and the object 2 are equal to each other. In FIG. 12, the horizontal axis represents a frequency and the vertical axis represents a received intensity. FIG. 12 shows IF signals after the time vs. signal level of FIG. 11 is Fourier-transformed.

In the upper part of FIG. 12, IF signal 511 indicates a real image of the IF signal in the ascending section and IF signal 521 indicates a virtual image of the IF signal in the ascending section. In the lower part of FIG. 12, IF signal 512 indicates a real image of the IF signal in the descending section and IF signal 522 indicates a virtual image of the IF signal in the descending section.

As illustrated in FIG. 12, the received intensities of the real images 511 and 512 of the IF signal in the ascending section and the descending section are P101, and the received intensities of the virtual images 521 and 522 of the IF signal in the ascending section and the descending section are P102.

When the moving velocities of the vehicle 3 and the object 2 are equal to each other, the relative velocity of the vehicle 3 and the relative velocity of the object 2 are equal to each other. Accordingly, as illustrated in FIG. 12, the peak frequency $f_{102}$ in the virtual images 521 and 522 of the IF signal is two times the peak frequency $f_{101}$ in the real images 511 and 512 of the IF signal. Here, the peak frequency $f_{101}$ corresponds to the position L101 and the peak frequency $f_{102}$ corresponds to the two times position (2×L101) of the position L101.

The target handover unit 127 pairs the IF signal 511 which is the real image of the ascending section and the IF signal 512 which is the real image of the descending section. The target handover unit 127 pairs the IF signal 521 which is the virtual image of the ascending section and the IF signal 522 which is the virtual image of the descending section. The target handover unit 127 may perform the virtual image determining process described with reference to FIG. 9 before performing the pairing process. Alternatively, the target handover unit 127 may perform the virtual image determining process described with reference to FIG. 9 after performing the pairing process.

The upper part of FIG. 13 is a diagram illustrating time vs. signal level of an ascending section when the moving velocities of the vehicle 3 having the motion control system 1 mounted thereon and the object 2 are different from each other. The lower part of FIG. 11 is a diagram illustrating time vs. signal level of a descending section when the moving velocities of the vehicle 3 having the motion control system 1 mounted thereon and the object 2 are different from each other. In FIG. 13, the horizontal axis represents a time and the vertical axis represents a signal level.

As illustrated in FIG. 13, the amplitude of waveform 503 in the ascending section ranges from 12 to 12 and the amplitude of waveform 504 in the descending section ranges from 12 to 12, similarly to the amplitude of waveform 503 in the ascending section. The frequency of waveform 503 in the ascending section is different from the frequency of waveform 504 in the descending section.

The upper part of FIG. 14 is a diagram illustrating frequency vs. received intensity of an ascending section when the moving velocities of the vehicle 3 having the motion control system 1 mounted thereon and the object 2 are different from each other. The lower part of FIG. 11 is a diagram illustrating frequency vs. received intensity of a descending section when the moving velocities of the vehicle 3 having the motion control system 1 mounted thereon and the object 2 are different from each other. In FIG. 14, the horizontal axis represents a frequency and the vertical axis represents a received intensity. FIG. 14 shows IF signals after the time vs. signal level of FIG. 13 is Fourier-transformed.

In the upper part of FIG. 14, IF signal 513 indicates a real image of the IF signal in the ascending section and IF signal 523 indicates a virtual image of the IF signal in the ascending section. In the lower part of FIG. 14, IF signal 514 indicates a real image of the IF signal in the descending section and IF signal 524 indicates a virtual image of the IF signal in the descending section.

As illustrated in FIG. 14, the received intensity of the real image 513 of the IF signal in the ascending section is P201 and the received intensity of the virtual image 523 of the IF signal in the ascending section is P201. The received intensity of the real image 514 of the IF signal in the descending section is P201 and the received intensity of the virtual image 524 of the IF signal in the descending section is P202.

In the example illustrated in FIG. 13, the frequency of waveform 504 in the descending section is higher than the frequency of waveform 503 in the ascending section. Accordingly, as illustrated in FIG. 14, the IF signal 513 after Fourier-transforming waveform 503 in the ascending section has a frequency lower than the IF signal 514 after Fourier-transforming waveform 504 in the descending section.

As illustrated in FIG. 14, the peak frequency $f_{202}$ of the virtual image 523 of the IF signal in the ascending section is two times the peak frequency $f_{201}$ of the real image 513 of the IF signal in the ascending section. The peak frequency $f_{212}$ of the virtual image 524 of the IF signal in the descending section is two times the peak frequency $f_{211}$ of the real image 514 of the IF signal in the descending section.

In the real images illustrated in FIG. 14, the relative velocity corresponding to the peak frequency $f_{201}$ in the ascending section is equal to the relative velocity corresponding to the peak frequency $f_{211}$ in the descending section. In the virtual images, the relative velocity corresponding to the peak frequency $f_{202}$ in the ascending section is two times the relative velocity corresponding to the peak frequency $f_{201}$. The relative velocity corresponding to the peak frequency $f_{212}$ in the descending section is two times the relative velocity corresponding to the peak frequency $f_{211}$.

In case of the virtual image based on reflection described with reference to FIG. 5, the relative velocity of the virtual image is two times the relative velocity of the real image. On the other hand, as described above, the IF signals corresponding to two objects, respectively may be obtained at the position of the two times frequency. As described above, when the images of the IF signals are both real images, the relative velocity is also two times. Accordingly, the target handover unit 127 compares the relative velocities as described with reference to FIG. 9.

The target handover unit 127 pairs the real image 513 of the IF signal in the ascending section and the real image 514 of the IF signal in the descending section. The target handover unit 127 pairs the virtual image 523 of the IF signal in the ascending section and the virtual image 524 of the IF signal in the descending section.

In this manner, even when the moving velocities of the vehicle 3 having the motion control system 1 mounted thereon and the object 2 are different from each other, the target handover unit 127 may perform the virtual image determining process described with reference to FIG. 9 before performing the pairing process. Alternatively the target handover unit 127 may perform the virtual image determining process described with reference to FIG. 9 after performing the pairing process.

As described above, the position information generating unit 120 pairs the real image of the IF signal in the ascending section and the real image of the IF signal in the descending section. The position information generating unit 120 pairs the virtual image of the IF signal in the ascending section and the virtual image of the IF signal in the descending section. As illustrated in FIGS. 12 and 14, the peak frequency of a virtual image is two times the peak frequency of a real image. In case of the virtual image based on noise, a virtual image does not formed at the two times frequency as described with reference to FIG. 7. Accordingly, the position information generating unit 120 determines whether a virtual image appears at the two times frequency of the real image through the processes of steps S108 to S111 in FIG. 9. Accordingly, according to this embodiment, it is possible to determine whether an image is a virtual image based on noise.

In this embodiment, the example where the distances of the target information pieces, the relative velocities of the target information pieces, and the azimuths of the target information pieces are compared is described with reference to FIG. 9, but the invention is not limited to this example. For example, the position information generating unit 120 may perform comparison of the distances of the target information pieces and comparison of the relative velocities of the target information pieces and may perform the virtual image determining process without performing comparison of the azimuths of the target information pieces. Alternatively, the position information generating unit 120 may perform comparison of the distances of the target information pieces and comparison of the azimuths of the target information pieces and may perform the virtual image determining process without performing comparison of the relative velocities of the target information pieces. Alternatively, the position information generating unit 120 may perform comparison of the relative velocities of the target information pieces and comparison of the azimuths of the target information pieces and may perform the virtual image determining process without performing comparison of the distances of the target information pieces. Alternatively, the position information generating unit 120 may perform only comparison of the distances of the target information pieces and may perform the virtual image determining process without performing comparison of the azimuths of the target information pieces and comparison of the relative velocities of the target information pieces.

In this embodiment, the example where the value of two times of the distance and the distance of the target information pieces as a comparison target are compared is described with reference to FIG. 9, but the invention is not limited to this example. A value of n (where n is an integer of 2 or more) times the distance may be compared with the distance of the target information pieces as a comparison target. Similarly, a value of n (where n is an integer of 2 or more) times the relative velocity may be compared with the relative velocity of the target information pieces as a comparison target. When a virtual image based on reflection appears in the IF signal, the received intensity of the IF signal is the highest at a frequency corresponding to two times the frequency. Accordingly, it is preferable that n=2 be set.

Second Embodiment

In the first embodiment, the example where the target handover unit 127 performs the virtual image determining process based on the IF signal. In this embodiment, the received intensity calculating unit 122 performs the virtual image determining process in step S4 illustrated in FIG. 8 based on at least one peak frequency of the peak frequency of modulation in the ascending section and the peak frequency of modulation in the descending section.

Figure 15:
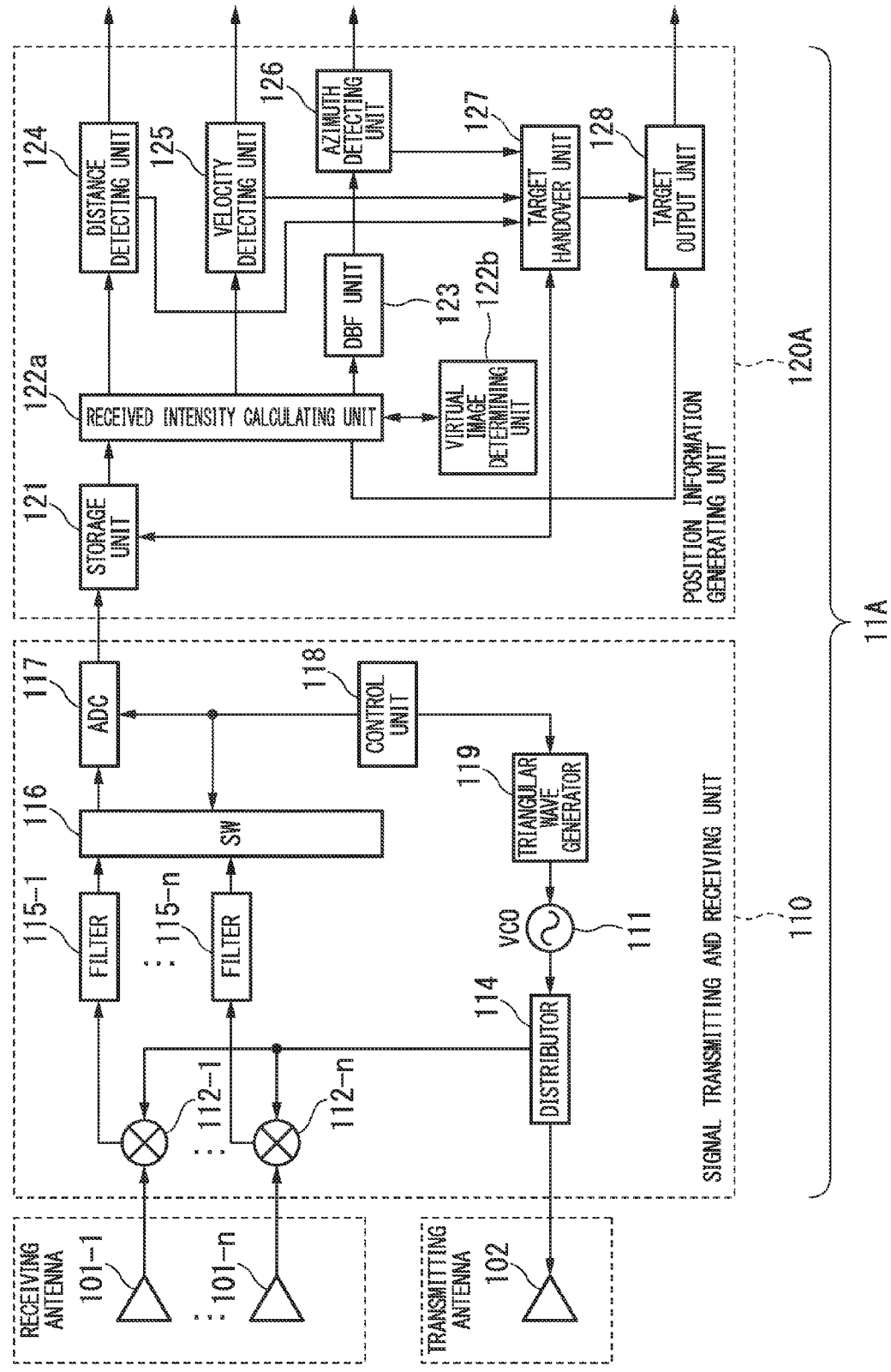
FIG. 15 is a diagram schematically illustrating a configuration of an object detecting device according to a second embodiment of the present invention.

FIG. 15 is a diagram schematically illustrating the configuration of an object detecting device 11A according to this embodiment. In FIG. 15, the functional units having the same functions as in the object detecting device 11 described with reference to FIG. 2 according to the first embodiment are referenced by the same reference numerals and description thereof will not be repeated. Similarly to the first embodiment, the object detecting device 11A is connected to the control instructing unit 13 (see FIG. 1).

As illustrated in FIG. 15, the object detecting device according to this embodiment is different from the object detecting device 11, in a received intensity calculating unit 122a and a virtual image determining unit 122b (processing unit) of a position information generating unit 120A.

The received intensity calculating unit 122a generates peak frequency information similarly to the received intensity calculating unit 122. The received intensity calculating unit 122a outputs the generated peak frequency information to the virtual image determining unit 122b, the distance detecting unit 124, and the velocity detecting unit 125.

The virtual image determining unit 122b determines whether an image is a real image, a virtual image based on reflection, and a virtual image based on noise based on the peak frequency information input from the received intensity calculating unit 122a as will be described later.

For example, when two peak frequencies are acquired as illustrated in FIG. 6, the virtual image determining unit 122b may perform the virtual image determining process by determining whether the IF signal 302 is present at the frequency $f_v$ of two times the peak frequency $f_r$ of the IF signal 301 in the modulation of the ascending section. When the IF signal 302 is present at the frequency $f_v$ of two times the peak frequency $f_r$ of the IF signal 301, the virtual image determining unit 122b determines that the IF signal 301 is a real image and outputs the determination result to the received intensity calculating unit 122a. The received intensity calculating unit 122a may output the target information piece to the processing units depending on the result input from the virtual image determining unit 122b.

When the IF signal 302 is present at the frequency $f_v$ of two times the peak frequency $f_r$ of the IF signal 301, the virtual image determining unit 122b determines that the IF signal 302 is a virtual image based on reflection and outputs the determination result to the received intensity calculating unit 122a. The received intensity calculating unit 122a may not output the target information piece to the processing units depending on the result input from the virtual image determining unit 122b.

When the IF signal 302 is not present at the frequency $f_v$ of two times the peak frequency $f_r$ of the IF signal 301, the virtual image determining unit 122b determines that the IF signal 301 is a virtual image based on noise and outputs the determination result to the received intensity calculating unit 122a. The received intensity calculating unit 122a may not output the target information piece to the processing units depending on the result input from the virtual image determining unit 122b.

Alternatively, the virtual image determining unit 122b may perform the virtual image determining process by determining whether the IF signal 302 is present at the frequency $f_v$ of two times the peak frequency $f_r$ of the IF signal 301 in the modulation of the descending section.

The virtual image determining unit 122b may perform the virtual image determining process by determining whether the IF signal 301 is present at the frequency $f_r$ of half times the peak frequency $f_v$ of the IF signal 302 in the modulation of the ascending section. Alternatively, the virtual image determining unit 122b may perform the virtual image determining process by determining whether the IF signal 301 is present at the frequency $f_r$ of half times the peak frequency $f_v$ of the IF signal 302 in the modulation of the descending section.

The virtual image determining unit 122b may perform the virtual image determining process by determining whether the IF signal 301 is present at the frequency $f_r$ of half times the peak frequency $f_v$ of the IF signal 302 in both the modulation of the ascending section and the modulation of the descending section. Alternatively, the virtual image determining unit 122b may perform the virtual image determining process by determining whether the IF signal 301 is present at the frequency $f_r$ of half times the peak frequency $f_v$ of the IF signal 302 in both the modulation of the ascending section and the modulation of the descending section.

As described above, in the object detecting device 11A according to this embodiment, the processing unit (virtual image determining unit 122b) determines that the image of a target peak frequency is a virtual image based on noise when the peak frequency is not present within a predetermined frequency range including a frequency of n times the target peak frequency.

Accordingly, in the object detecting device 11A according to this embodiment, it is possible to determine whether an image of a peak frequency is a real image, a virtual image based on reflection, or a virtual image based on noise based on the peak frequency information generated by the received intensity calculating unit 122a. As a result, it is possible to suppress an influence of noise from a noise source.

In this embodiment, the example where the received intensity calculating unit 122 generates position information indicating that a target is not detected based on the determination result in the virtual image determining unit 122b and outputs the generated position information to the target output unit 128 when the peak frequency is a virtual image based on noise is described, but the invention is not limited to this example. When the peak frequency is a virtual image based on noise, the virtual image determining unit 122b may generate position information indicating that a target is not detected and may output the generated position information to the target output unit 128.

In the first and second embodiments, the example where a virtual image based on noise is determined is described, but the object detecting device 11 or 11A may suppress a virtual image based on reflection using known techniques.

In the first and second embodiments, the example where the driving support control unit 14 includes the warning sound control unit 141, the brake control unit 142, and the accelerator control unit 143 is described, but the above-mentioned embodiments are not limited to this example. The driving support control unit 14 has only to include a configuration for controlling whether to make a motion based on the position information of a detected object, for example, an inter-vehicle distance control unit.

It has been stated in the first and second embodiments that the object detecting device 11 or 11A is mounted on a vehicle, but the invention is not limited to these embodiments. For example, the object detecting device 11 or 11A may be applied to an independently-movable robot, a bipedal robot, a two-wheel vehicle, a three-wheel vehicle, and the like.

A part of the object detecting device 11 or 11A in the above-mentioned embodiments, such as the received intensity calculating unit 122, the DBF unit 123, the distance detecting unit 124, the velocity detecting unit 125, the azimuth detecting unit 126, the target handover unit 127, the target output unit 128, or the virtual image determining unit 122b, may be embodied by a computer. In this case, such control functions may be realized by recording a program for realizing the control functions on a computer-readable recording medium, reading the program recorded on the recording medium into a computer system, and executing the read program. Here, the "computer system" is a computer system built in the object detecting device 11 and includes an OS and hardware such as peripherals. The "computer-readable recording medium" means a storage device such as a portable medium such as a flexible disk, a magnetic-optical disk, a ROM, and a CD-ROM and a hard disk built in a computer system. The "computer-readable recording medium" includes a medium dynamically holding a program for a short time, such as a communication line in a case where a program is transmitted through a network such as Internet or a communication line such as a telephone line, and a medium holding a program for a predetermined period of time, such as a volatile memory in a computer system serving as a server or a client in that case. The program may realize a part of the above-mentioned functions or may realize the above-mentioned functions by combination with a program recorded in advance on a computer system.

All or part of the object detecting device 11 in the above-mentioned embodiment may be embodied as an integrated circuit such as a large scale integration (LSI) circuit. The functional blocks of the object detecting device 11 may be individually made into processors or all or a part thereof may be integrated as a processor. The integration is not limited to the LSI, but may be embodied by a dedicated circuit or a general-purpose processor. When an integration technique with which the LSI is replaced appears with advancement of semiconductor techniques, an integrated circuit based on the technique may be used.

While the embodiments of the invention have been described with reference to the accompanying drawings, the invention is not limited to the above-mentioned embodiments and can be modified in various designs without departing from the gist of the invention.

What is claimed is:

1. An object detecting device comprising:
    a signal transmitting and receiving unit configured to generate an intermediate frequency signal based on a transmission signal and a reception signal which is a reflected wave thereof; and
    a processing unit configured to determine that an image of a target peak frequency is a virtual image based on noise when it is determined that a peak frequency of predetermined n times the target peak frequency is not present in information based on the intermediate frequency signal generated by the signal transmitting and receiving unit and to detect an object based on the determination result, where n is an integer of 2 or greater.

2. The object detecting device according to claim 1, further comprising a distance detecting unit configured to calculate a distance as the information based on the peak frequency of the intermediate frequency signal generated by the signal transmitting and receiving unit,
    wherein the processing unit determines that an image of a peak frequency corresponding to a target distance is a virtual image based on noise when it is determined that target information of a target candidate corresponding to a distance of predetermined n times the distance calculated by the distance detecting unit is not present, where n is an integer of 2 or greater.

3. The object detecting device according to claim 1, further comprising a velocity detecting unit configured to calculate a relative velocity as the information based on the peak frequency of the intermediate frequency signal generated by the signal transmitting and receiving unit,
    wherein the processing unit determines that an image of a peak frequency corresponding to a target relative velocity is a virtual image based on noise when it is determined that target information of a target candidate corresponding to a relative velocity of predetermined n times the relative velocity calculated by the velocity detecting unit is not present based on the target peak frequency, where n is an integer of 2 or greater.

4. The object detecting device according to claim 1, wherein the processing unit determines that an image of a peak frequency corresponding to a target relative velocity is a virtual image based on noise when it is determined that an IF signal corresponding to predetermined n times the IF signal which is information based on the peak frequency of the intermediate frequency signal generated by the signal transmitting and receiving unit is not present, where n is an integer of 2 or greater.

5. The object detecting device according to claim 3, wherein the processing unit determines that the image of the target peak frequency is a virtual image based on noise when the absolute value of a difference between a value corresponding to predetermined n times a first distance calculated by a distance detecting unit configured to calculate a distance as the information based on the peak frequency of the intermediate frequency signal generated by the signal transmitting and receiving unit and a value of a second distance calculated by the distance detecting unit is smaller than a predetermined first threshold value and the absolute value between a value corresponding to n times a first relative velocity calculated by the velocity detecting unit and a value of a second relative velocity calculated by the velocity detecting is smaller than a predetermined second threshold value.

6. The object detecting device according to claim 1, further comprising an azimuth detecting unit configured to detect an azimuth based on the peak frequency of the intermediate frequency signal generated by the signal transmitting and receiving unit,
    wherein the processing unit determines that the image of the target peak frequency is an image based on a real object when the absolute value of a difference between a first azimuth detected by the azimuth detecting unit and a second azimuth detected by the azimuth detecting unit is smaller than a predetermined third threshold value, and determines that the image of the target peak frequency is a virtual image based on noise when the absolute value of the difference is equal to or more than the predetermined third threshold value.

7. The object detecting device according to claim 1, wherein the processing unit determines that an image of the target peak frequency is a virtual image based on noise when the peak frequency is not present in a predetermined frequency range including the frequency of the predetermined n times the target peak frequency.

8. An object detecting method comprising:
a signal transmitting and receiving step of generating an intermediate frequency signal based on a transmission signal and a reception signal which is a reflected wave thereof;
a processing step of determining that an image of a target peak frequency is a virtual image based on noise when it is determined that a peak frequency of predetermined n (where n is an integer of 2 or greater) times the target peak frequency is not present in information based on the intermediate frequency signal generated in the signal transmitting and receiving step and detecting an object based on the determination result: and
a step of calculating and outputting, to a driving support control unit of a motion control system, a distance based on the peak frequency of the intermediate frequency signal generated by the signal transmitting and receiving step.

9. A non-transitory computer readable medium having stored thereon an object detecting program which when executed causes a computer to perform:

a signal transmitting and receiving procedure of generating an intermediate frequency signal based on a transmission signal and a reception signal which is a reflected wave thereof; and
a processing procedure of determining that an image of a target peak frequency is a virtual image based on noise when it is determined that a peak frequency of predetermined n (where n is an integer of 2 or greater) times the target peak frequency is not present in information based on the intermediate frequency signal generated in the signal transmitting and receiving procedure and detecting an object based on the determination result.

10. A motion control system comprising:
an object detecting device;
a motion control unit configured to control a motion based on a distance or a velocity of an object input from the object detecting device;
a signal transmitting and receiving unit configured to generate an intermediate frequency signal based on a transmission signal and a reception signal which is a reflected wave thereof; and
a processing unit configured to determine that an image of a target peak frequency is a virtual image based on noise when it is determined that a peak frequency of predetermined n (where n is an integer of 2 or greater) times the target peak frequency is not present in information based on the intermediate frequency signal generated by the signal transmitting and receiving unit and to detect an object based on the determination result.

* * * * *